Nov. 17, 1925.
H. H. DES ROCHES
MINING DRILL
Filed March 21, 1924
1,561,975
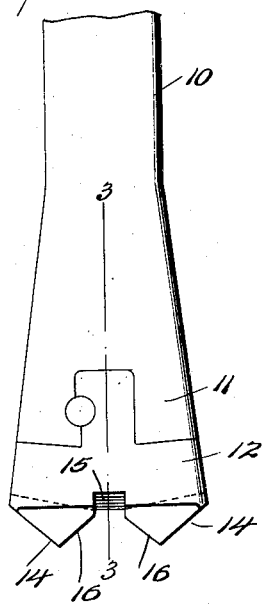
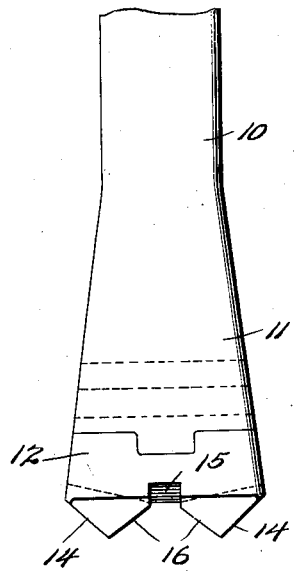
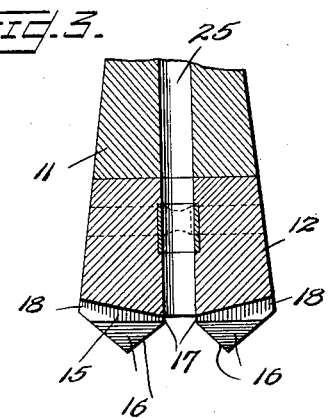
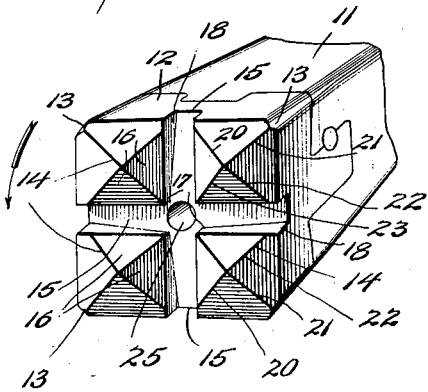
Inventor
Hilton H. Des Roches,
By Watson, Coit, Moser & Grindle,
Attorney Patented Nov. 17, 1925.

1,561,975

UNITED STATES PATENT OFFICE.

HILTON HENRY DES ROCHES, OF BUTTE, MONTANA, ASSIGNOR OF ONE-HALF TO FRANK F. HAYES, OF BUTTE, MONTANA.

MINING DRILL.

Application filed March 21, 1924. Serial No. 700,958.

*To all whom it may concern:*

Be it known that I, HILTON H. DES ROCHES, a citizen of the United States, and residing at Butte, Silver Bow County, State of Montana, have invented certain new and useful Improvements in Mining Drills, of which the following is a specification.

This invention relates to drills or bits and more particularly to that type of drill for use in mining, quarrying, well drilling, etc., and for use either by hand or in drilling machines.

It is an object of this invention to provide a drill having superior cutting qualities.

It is another object of this invention to provide a drill having an increased number of cutting edges in order to increase the speed of cutting.

It is a still further object of this invention to provide a drill having a large amount of clearance and which is of particular value for drilling in very hard rock.

It is a still further object of this invention to provide a drill which can be readily rotated by hand while in use in a drilling machine and with which it is almost impossible to produce a fitchered hole.

For a complete understanding of this invention, reference should be had to the following specification taken in conjunction with the accompanying drawing, in which:—

Fig. 1 is a side elevation of a drill constructed according to this invention;

Fig. 2 is a similar view taken at an angle of 90° to Figure 1.

Fig. 3 is a section on the line 3—3 of Figure 1; and

Fig. 4 is a perspective view.

As shown in the drawings, the drill is of the general type used for drilling rock, coal, etc., and consists of a steel bar of any desired shape and size having cutting edges formed on one end thereof and which is adapted to be used by striking on the opposite end, either with a hand hammer or by means of a drilling machine, the drill being rotated a part of a revolution before each blow of the hammer. Drills of this particular type may be used either wet or dry, but it has been found of considerable advantage in drilling certain types of material to use the drill wet. There are a number of common forms of these drills in use, of which the so-called cross-bit is probably the commonest, and the four-pointed or star drill of almost equal prominence, but it has been found that with drills of these types, the bottom of the hole is sometimes formed wedge-shaped making it almost impossible to rotate the drill, since the cutting edges thereof bind in this wedge-shaped portion at the bottom of the hole. This is especially true where a power driven device is used to operate the drill leaving the rotation thereof to be done by the hand of the operator.

As shown in the figures, a drill constructed according to this invention comprises a shank portion 10, preferably square in cross-section, and having an enlarged or upset end 11, square in cross-section. The cutting drill point may be formed integral with the shank, in which case, after a few sharpenings, it is necessary to again upset the end in order to retain the gage, but it is preferable to construct the shank and drill point 12 as separate parts so that the drill point may be removed for sharpening, or when worn out can be replaced without any change in the shank, and for this purpose, there is disclosed a means of connecting the drill point and shank, such means being fully disclosed in my prior Patent No. 1,423,713, issued July 25, 1922. Since this means for attaching the drill point to the shank forms no part of the present invention, it will not be explained.

The enlarged portion 11 of the drill is of square cross-section, but near the end the corners are relieved or rounded as at 13 in order to strengthen the outer cutting edges and for the purpose of increasing the amount of material on the corners to help the drill to hold its gage.

The cutting face of the drill comprises four similar low pyramids 14, each one having a square base of an area substantially one-quarter of that of the drill face. These four pyramids are separated by a pair of channels 15, 15 cutting away a portion of each of them and extending at right angles to each other and transversely across the face of the drill thus reducing the area of the bases and their respective inner faces 16, 16 so that the pyramids have square bases but are not symmetrical. These channels may be of any form but as shown are of uniform width, rectangular in cross-section and may be increased in depth from the center toward the ends if necessary, so that viewed in longitudinal section they are substantially arcs of circles, as best shown in Figure 3. The depth of these channels at the center is very slight, giving a clearance 17 for chips, whereas at their outer ends the clearance is considerably greater as at 18 to accommodate the increased number of chips accumulating and moving outwardly from the center as the drill is operating.

It will be noted that each pyramid, in itself, forms an independent four-cornered wedge having the cutting edges 20, 21, 22 and 23 formed by the faces of the pyramid meeting at obtuse angles, and each face thus serving to drive the chips away from the entering point and cutting edges while the channels 15, 15 serve to carry to the outer faces of the drill the accumulation of chips. Since the drill is square and by its rotation cuts a circular hole, clearance for the upward movement of the chips is provided in the form of segments having chords formed by the outer faces of the drill and arcs formed by the sides of the hole.

It is sometimes desirable when drilling rapidly to supply a continuous stream of water, which serves not only to cool the cutting edges, but to carry away the chips, and for this purpose I have provided through the center of the drill a bore 25 through which water may be forced entering at the bottom of the hole at the intersection of the channels 15, 15 and serving to carry the chips outward through these channels to the segmental clearance spaces, previously mentioned.

Owing to the peculiar shape of the cutting face of the drill it normally rests on a flat surface at the four apices of the pyramids only, and the first blow from the hammer will cause four indentations in the rock of inverted pyramid shape. Then upon rotation of the drill through an angle of substantially 45°, a second set of similar indentations will be formed, each one being between two of the previous ones so that the rock is chipped off in each direction toward the original set of holes, and this procedure is continued throughout the drilling process, there being almost no chance of producing a fitchered hole owing to the absence of wedge-shaped cutters at right angles to the direction of movement of the drill and to the fact that the four sharp points will take hold even upon slanting surfaces, causing the drill to bite when struck instead of rotating itself back to the position it assumed at the end of the previous blow. This is a very important feature of this drill and enables more rapid work to be done with less labor on the part of the operator.

When the drills are used in machines such as the pneumatic or electric type, it is usually necessary for the operator to rotate the drill by hand and while it is being reciprocated rapidly or driven forward by means of the machine, and since all of the angles of this drill are quite obtuse and the faces are more nearly parallel to the surface being cut than those of the usual type of drill, it can be seen that the rotation may be readily effected. The time for effecting this rotation is very short, since the power machinery delivers its blows in very rapid succession, and in order to prevent the operator from tiring too rapidly, it is necessary that the drill may be rotated quite easily.

Upon examination of the face of the drill, it will be noted that during rotation, it practically rides on the four apices of the pyramid reducing friction to a minimum, and upon being lifted, due to its rotation, from the indentations made by these four apices, contact between the rock and the drill is substantially limited to one edge, such as 20, of each pyramid, when the drill is rotated in the direction of the arrow in Figure 4, and since these edges are tangent to a circle having its center at the center of the drill and passing through the points of the pyramids, the resistance offered to rotation will be very slight.

From the preceding, it will be evident that this invention provides a material improvement in drills of the type described, and while there is disclosed a particular modification thereof, it is intended that the claims shall cover all forms that come within their scope.

Having thus described the invention what is claimed as new and desired to be secured by Letters Patent is:

1. In a drill of the class described, in combination, a shank, an enlarged end and a cutting face formed of four spaced pyramids.

2. In a drill of the class described in combination, a shank, an enlarged end substantially square and a cutting face formed of four similar pyramids spaced apart.

3. In a drill of the class described in combination, a shank, an enlarged end and a cutting face formed entirely of four complete symmetrically spaced, similar pyramids.

4. In a drill, in combination, a shank, an enlarged end of square cross-section and a cutting face including four similar pyramids having their apices arranged on the corners of a square having its edges parallel to the edges of the end of the drill.

5. In a drill, in combination, a shank, an enlarged end of square cross-section, a cutting face having thereon four similar pyramids, each pyramid having a square base with its edges parallel to the faces of the enlarged end.

6. In a drill, in combination, a shank, an enlarged end of square cross section, a cutting face, four pyramids arranged thereon, the base area of each pyramid being one-fourth of the area of the cutting face, the inner sides of each pyramid being cut away to form a pair of intersecting grooves across the cutting face.

7. In a drill, in combination, a shank, an enlarged end of square cross section, a cutting face, four pyramids arranged thereon, the base area of each pyramid being one-fourth of the area of the cutting face, the inner sides of each pyramid being cut away to form a pair of intersecting grooves across the cutting face, and a hole longitudinally through said shank from the point of intersection of said grooves.

8. In a drill, in combination, a shank of square cross-section, an enlarged end thereon of similar cross section, a cutting face, four, low, square pyramids arranged thereon, one in each corner, and a channel of rectangular cross section between each pair of pyramids, said channels meeting at the center of said face.

9. In a drill, in combination, a square shank, an enlarged end thereon of square cross-section, four, low square pyramids arranged on the square end thereof with two of the base edges of each pyramid coinciding with two of the edges of said square end, grooves of rectangular cross-section between each pair of pyramids, the width of said grooves being constant but the depth increasing from the center to the edge of said square end.

10. In a drill, in combination, a square shank, an enlarged end thereon of square cross-section, the corners thereof being slightly rounded, a cutting face thereon, four, low, square pyramids arranged on said cutting face, two of the base edges of each pyramid coinciding with two of the edges of said cutting face, grooves of rectangular cross-section and constant width between each pair of pyramids, the depth of said grooves increasing progressively from the center to the edge of said face, and a longitudinal hole through said shank entering said face at the intersection of said grooves.

In testimony whereof I hereunto affix my signature.

HILTON HENRY DES ROCHES.